United States Patent Office 2,970,224
Patented Jan. 31, 1961

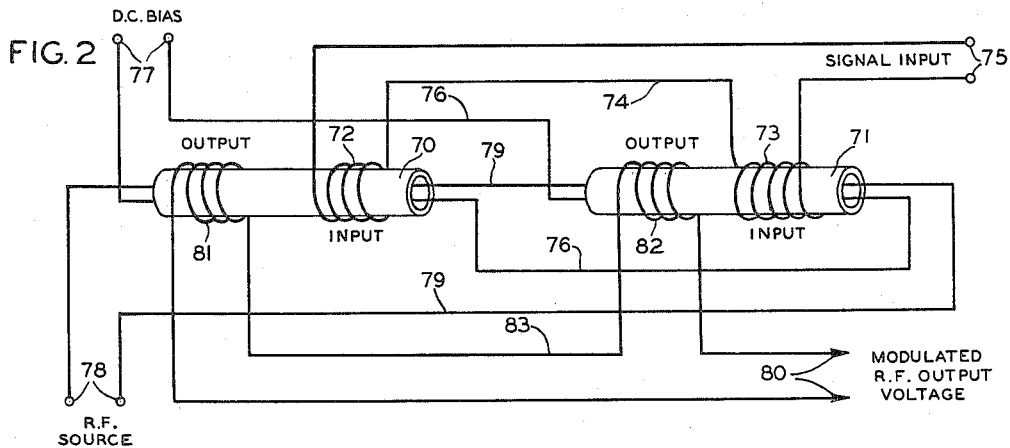
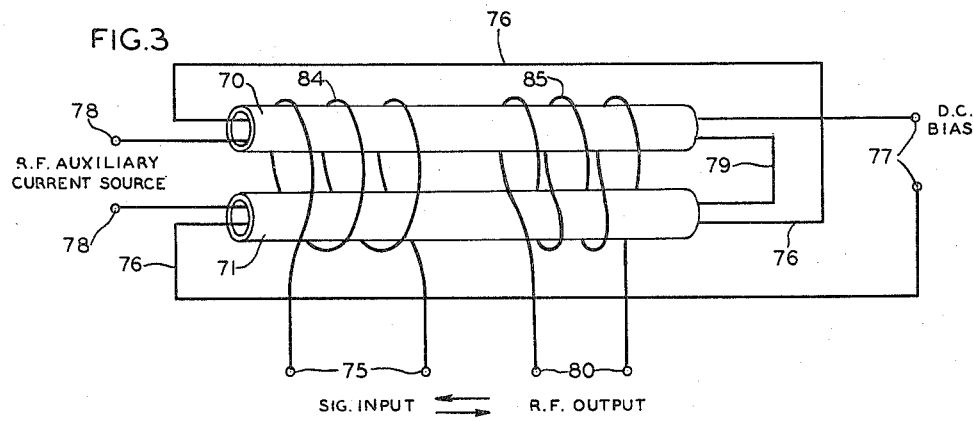
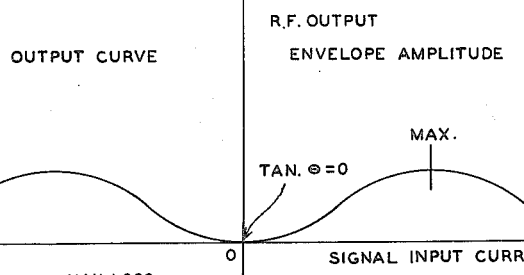
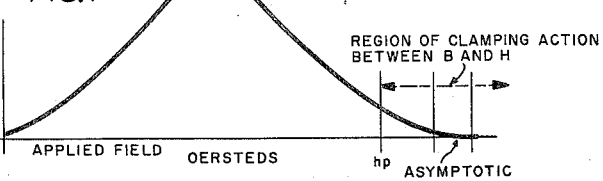

2,970,224

CARRIER OPERATED TRANSVERSE MAGNETIC AMPLIFIER WITH CANCELLATION OF INTERACTION BETWEEN INPUT AND OUTPUT CIRCUITS

Daniel M. Lipkin and Richard W. Spencer, Philadelphia, Pa., assignors to Sperry Rand Corporation, a corporation of Delaware Filed Mar. 17, 1955, Ser. No. 494,852

10 Claims. (Cl. 307—88)

The present invention concerns a novel primary type of magnetic amplifier utilizing transverse magnetization and featuring cancellation of interaction between input and output circuits.

It is an object of the invention to provide a magnetic amplifier which operates on controllable mutual inductance produced by suitable use of transverse magnetizing fields applied to a ferro-magnetic body.

It is an object of the invention to operate a magnetic amplifier in a condition in which any changes of magnetization of the core will occur without appreciable energy storage or irreversible loss as heat in the core material.

It is an object of the invention to produce controllable mutual inductance in two windings positioned on a core so as to have zero mutual inductance under certain initial conditions and to experience controlled mutual inductance upon the rotation or oscillation of the saturated magnetization vector of the core material. The invention produces cancellation of undesired interaction in the transverse structure. Mutual coupling which would produce interaction between the signal winding and the radio frequency power winding or between the bias winding and the radio frequency power winding is cancelled.

Reference is made to copending applications Serial No. 382,180, filed September 24, 1953, now Patent No. 2,892,998, for "Signal Translating Device" of John Presper Eckert, Jr. and Theodore H. Bonn; and Serial No. 402,858, filed January 8, 1954, for "Signal Translating Device" of Theodore H. Bonn and Robert D. Torrey; for a discussion of the ferro-magnetic material comprising the cores of magnetic amplifiers both of the pulse type and the present transverse magnetization type. Application Serial No. 494,903 of even date herewith, for "Transverse Magnetic Amplifier" of Daniel M. Lipkin, gives a background discussion of the present invention which supplements the present disclosure.

In the drawings, like numerals refer to like parts throughout.

Figure 1 is an energy loss diagram for core material during various conditions of operation.

Figure 2 is a schematic diagram of one form of transverse magnetic amplifier according to the invention.

Figure 3 is a schematic diagram of a second form of transverse magnetic amplifier according to the invention.

Figure 4 is a schematic diagram of an output curve for the transverse magnetic amplifiers of Figures 2 and 3.

The basic considerations concerning transverse devices comprising the present invention may be formulated as follows:

(1) Transverse fields are in general applied to a core of ferromagnetic material simultaneously. It may be noted that the B—H relationships are quantitatively unknown except under the conditions to be described below.

(2) It is possible by means of the invention to obtain quantitatively predictable B—H relationship in transverse core structures, consisting in the resultant B vector being a simple mathematical function of the resultant H vector.

(3) The above is accomplished by observing strictly the condition that the scalar magnitude of the vector resultant magnetizing force be kept above a predeterminable level characteristic of the magnetic material.

(A) When the above condition is met, the vector flux density B is substantially given by the vector equation:

(1) $$\vec{B} = \frac{B_s \vec{H}}{h}$$

where $B_s$ is the saturation flux density magnitude for the material; $\vec{H}$ is the resultant magnetizing force vector in the material; and $h$ is the scalar magnitude of $\vec{H}$. The above equation states that $\vec{B}$ is in the same direction as $\vec{H}$ and has the fixed magnitude $B_s$. This relationship is justified and occurs when the above condition is satisfied.

(B) When Equation 1 is satisfied, the core itself does not absorb or store energy even temporarily, but merely serves to transfer energy between the sources of the transverse fields, yielding loss-less operation.

(4) Conditions 3 above is met by having at least two transverse fields satisfying the condition:

(2) $$h \geq hp$$

where $hp$ is the predeterminable level referred to in 3 above.

(5) In a practical embodiment, a transverse magnetic structure, constructed in accordance with the foregoing considerations, would comprise a body of magnetic material having magnetizing means associated therewith and adapted to impress mutually orthogonal fields on the said body. An output effect may be produced from such a transverse structure by varying the magnitude of at least one of the transverse fields and, so long as the condition represented by Equation 2 is satisfied, the operation of the device will be substantially loss-less.

(6) The predeterminable level $hp$ referred to above may be taken to be that value of magnetizing field larger than the value at which the specific rotational hysteresis loss for the material peaks (see Figure 1) and for which the specific rotational hysteresis loss is appreciably less than said maximum rotational hysteresis loss.

The present invention is a variant of the structures disclosed in the application Serial No. 494,903 above referred to and in particular provides several arrangements by which cancellation of substantially all of the interaction between the input and output circuits can be achieved when the transverse magnetic amplifier is carrier operated.

One form the invention may take is shown in Figure 2 in which there is only second order radio-frequency pickup in the signal circuit. The construction provides a method of canceling radio-frequency pickups by reversing the relative directions of bias and radio-frequency wires in one of two tubular cores. Two cores 70 and 71 are constructed of long slender ferro-magnetic tubes. The signal input winding is in two parts, 72, wound on core 70, and winding 73, wound in the opposite direction on core 71. Adjacent ends of windings 72, 73 are connected by wire 74 and the opposite ends of the windings 72, 73 are connected to signal input terminals 75.

Direct current bias is supplied by winding 76 threaded through the interior of both cores 70 and 71, and provided with terminals 77 for the application of a saturating current. Radio-frequency auxiliary supply is applied at terminals 78 of winding 79 also threading the interiors of both cores 70 and 71 to produce a cyclic change in the magnetizing field. Modulated radio-frequency output signals appear at output terminals 80 as they are induced in output winding 81 on core 70 and output winding 82 on core 71. The adjacent ends of windings 81 and 82 are connected by wire 83.

The essential points concerning winding senses of the various windings can be expressed as follows:

(1) The relative direction in which the direct current bias winding 76 and the radio-frequency auxiliary supply winding 79 pass each other in threading one tubular core, must be opposite from their relative direction in the other core.

(2) The direction relative to each other in which the signal windings 72, 73 and the output windings 81, 82, are wound on one tubular core must be opposite to that in which they are wound on the other core.

The amplifier of Figure 2 operates as follows. With no signal in windings 72 and 73, the saturation flux density, due the combined energization of the bias winding 76 and the winding 79, remains substantially stationary and there is no appreciable mutual coupling between wire 79 and either of output windings 81 or 82. On the application of signal current at terminal 75, a resultant magnetizing field is produced which rotates the direction of the saturation flux density in phase with it. Winding 79 then varies the direction of the magnetizing field causing the direction of the saturation flux density to change in accordance with the resultant field. The signals induced in windings 81, 82 combine in phase to produce useful output in the form of a radio-frequency voltage (carrier frequency) modulated by the signal (pulse), which appears at terminals 80 where it may be rectified to determine the envelope. The peak value of output signal is obtained with a signal input amplitude approximately equal to the direct current bias.

The output produced resembles qualitatively the curve of Figure 4, the radio-frequency voltage induced in signal windings 72, 73 canceling out very closely and leaving a negligible resultant, at most. Any normal envelope forming circuit may be employed at the output and may include diode and condenser-resistance elements to suit. Such arrangements are well known for producing rectified output envelopes of the general type shown in Figure 4.

Figure 3 shows one method of combining the input windings 72, 73 into a single winding 84 and the output windings 81, 82 into a single output winding 85. The geometry of Figure 3 may be a little inconvenient where the signal winding 84 and the output winding 85 extend the full length of cores 70 and 71. It should be noted that it is characteristic of transverse magnetic cores, when two such cores are supplied with bias current and RF (auxiliary) current in the same relative phase, that no series connection of their input windings will produce cancellation of RF pickup in the combined signal input circuit. This occurs because a reversal of the lead to one of the two input windings on the two cores reverses the direction of signal current through that winding; and this, through the peculiarities of the transverse magnetic coupling of energy, produces in turn a reversal of phase of the RF pickup in the coil in question, which cancels the expected reversal of phase of the RF pickup. Thus, the lead reversal does not change the RF pickup polarity in the coil in question. The only way in which cancellation of RF pickup between input windings on two transverse cores can be obtained is to supply the two cores with bias current and RF (auxiliary) current in opposite relative phase.

The above amplifiers operate with negligible core hysteresis losses as shown in Figure 1, and discussed above. They can be constructed in practical sizes and can be operated at very high frequencies to obtain increased power gain.

While there have been disclosed above what are at present believed to be the preferred forms of the invention, the appended claims are expressed in generic terms to include all variations thereof which fall within the true spirit of the invention.

We claim:

1. A transverse magnetic amplifier having cancellation of interference between input and output comprising a plurality of ferromagnetic cores having channels therethrough, a first winding threading said channels, means to apply a radio frequency current to said first winding for producing a magnetic field, a second winding threading said channels in the same direction in one core as said first winding and in the opposite direction in another of the cores as compared to said first winding, means to supply a direct current to said second winding, a signal input winding wound on both cores in a direction orthogonal to said first and second windings, a fourth winding on said cores means to apply an input signal to said signal input winding, the resultant magnetic field of said first, second, and input windings experiencing rotation and being sufficiently large to carry the material of said cores into the region of decreasing rotational hysteresis loss to cause the resultant magnetic flux to follow to a desired extent the movement of said resultant field and thereby to induce modulated radio frequency output voltage in said fourth winding carried by said cores, said opposite direction of threading said second winding functioning to cancel interaction between the circuits of said first winding and said signal input winding.

2. The combination set forth in claim 1 in which said input and said output windings each have two sections and are wound with one of each said sections around one core and the other of said sections being wound around a second core.

3. The combination set forth in claim 1, in which said input and said output windings each have a single section, both sections being wound around a plurality of cores.

4. The combination set forth in claim 1, said cores being in the form of elongate cylinders of ferro-magnetic material having a substantially rectangular characteristic hysteresis loop.

5. The combination set forth in claim 4, in which said input and output windings are wound in sections, one section of each being wound around one core and the other section being wound around another core.

6. A transverse magnetic amplifier device comprising a plurality of cores of ferro-magnetic material having a substantial rectangular hysteresis loop, said cores having channels therethrough, a first magnetic field producing winding threading said channels, a second magnetic field producing winding threading one said channel in the same field producing sense as said first winding and threading a channel in a second of said cores in the opposite field producing sense as said first winding, means to supply radio frequency power to one of said windings and means to supply direct current bias power to the other of said windings, an input winding wound around said cores in field producing relation orthogonal with respect to that produced by said first two windings, signal current input means for said input winding, the resultant magnetic field of said three windings experiencing movement of rotation and being sufficiently large to carry the material of said cores into the region of decreasing rotational hysteresis loss to cause the resultant magnetic flux to follow to a desired extent the movement of said resultant field, an output winding wound around the outside of said cores, one of said output and input windings being wound around one of said cores in a sense opposite to the sense of winding thereof around the other of said cores whereby changes in the direction of the saturated magnetization of the core material will induce a signal in said output winding and interaction between said input and said output windings is cancelled.

7. A transverse magnetic amplifier as recited in claim 1, wherein said fourth winding is wound on one of said cores in the same direction as said input winding thereon and wound on the other of said cores in the opposite direction from said input winding thereon.

8. The combination in a transverse magnetic amplifier comprising a plurality of elements of magnetic material, first means for applying a first field to first and second ones of said elements, said first means including a first winding means, and means for energizing said first winding means, second means for applying a second field to said first element in the same direction as said first field and to said second element in the opposite direction from said first field, said second means including a second winding means, and means for energizing said second winding means, third means for applying a third field to said elements including a third winding means, and means for energizing said third winding means, a fourth winding means linked to said elements, said first and second winding means being linked to said element in directions transverse to that of said third winding means so that said first and third fields and said second and third fields are non-parallel and intersect each other at an angle in said material, the energizations supplied by said first, second, and third energizing means being such that at least the field in one of said directions has a variable magnitude and said fields have a moving resultant that saturates said element and the resultant saturated magnetic flux moves and tends to follow the movement of the resultant of said fields, and means for deriving output signals connected to said fourth winding means.

9. The combination as recited in claim 8, wherein said third winding means links said first and second elements in opposite directions, respectively.

10. The combination as recited in claim 9, wherein said fourth winding means links said first and second elements in the opposite and same directions, respectively, compared to the directions of linkage of said third winding means.

References Cited in the file of this patent

UNITED STATES PATENTS

| 1,504,882 | Elmen | Aug. 12, 1924 |
| 2,666,151 | Rajchman et al. | Jan. 12, 1954 |
| 2,748,296 | Lipkin | May 29, 1956 |
| 2,811,652 | Lipkin | Oct. 29, 1957 |
| 2,814,733 | Lipkin | Nov. 26, 1957 |

OTHER REFERENCES

Communications & Electronics, January 1954, pp. 822–830.